US007979862B2

(12) United States Patent
Miller et al.

(10) Patent No.: US 7,979,862 B2
(45) Date of Patent: Jul. 12, 2011

(54) SYSTEM AND METHOD FOR REPLACING AN INOPERABLE MASTER WORKLOAD MANAGEMENT PROCESS

(75) Inventors: Troy Don Miller, Plano, TX (US); Thomas Edwin Turicchi, Jr., Dallas, TX (US); Isom L. Crawford, Jr., Royse City, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1967 days.

(21) Appl. No.: 11/019,070

(22) Filed: Dec. 21, 2004

(65) Prior Publication Data

US 2006/0136929 A1    Jun. 22, 2006

(51) Int. Cl.
G06F 9/46        (2006.01)
G06F 9/455       (2006.01)
G06F 15/16       (2006.01)
G06F 15/173      (2006.01)
G06F 11/00       (2006.01)

(52) U.S. Cl. ............ 718/104; 718/1; 718/105; 709/201; 709/208; 709/223; 709/226; 714/41; 714/47; 714/55

(58) Field of Classification Search .................. 709/202, 709/203, 208, 214, 215, 224; 718/104, 107, 718/1, 105
See application file for complete search history.

(56) References Cited

U.S. PATENT DOCUMENTS

| | | | | |
|---|---|---|---|---|
| 5,003,464 A * | 3/1991 | Ely | ............... | 714/10 |
| 5,287,453 A | 2/1994 | Roberts | | |
| 5,390,326 A * | 2/1995 | Shah | ............... | 370/222 |
| 5,919,266 A * | 7/1999 | Sud et al. | ............... | 714/13 |
| 6,014,686 A * | 1/2000 | Elnozahy et al. | ............... | 709/202 |
| 6,467,050 B1 * | 10/2002 | Keung | ............... | 714/27 |
| 6,571,350 B1 * | 5/2003 | Kurokawa et al. | ............... | 714/6 |
| 6,718,486 B1 * | 4/2004 | Roselli et al. | ............... | 714/41 |
| 6,976,112 B2 * | 12/2005 | Franke et al. | ............... | 710/302 |
| 7,051,188 B1 * | 5/2006 | Kubala et al. | ............... | 712/29 |
| 7,137,014 B2 * | 11/2006 | Dake et al. | ............... | 713/300 |
| 7,225,435 B2 * | 5/2007 | Flores et al. | ............... | 717/135 |
| 7,257,811 B2 * | 8/2007 | Hunt et al. | ............... | 718/1 |
| 7,350,117 B2 * | 3/2008 | Garcia | ............... | 714/55 |
| 7,353,259 B1 * | 4/2008 | Bakke et al. | ............... | 709/208 |
| 7,373,644 B2 * | 5/2008 | Aborn | ............... | 718/105 |
| 7,444,396 B2 * | 10/2008 | King et al. | ............... | 709/223 |
| 7,461,130 B1 * | 12/2008 | AbdelAziz et al. | ............... | 709/208 |

(Continued)

FOREIGN PATENT DOCUMENTS

EP    0631233    6/1994

(Continued)

OTHER PUBLICATIONS

U.S. Appl. No. 10/206,594, McCarthy et al.

Primary Examiner — Jennifer N. To

(57) ABSTRACT

In one embodiment, a method comprises executing respective workload management processes within a plurality of computing compartments to allocate at least processor resources to applications executed within the plurality of computing compartments, selecting a master workload management process to reallocate processor resources between the plurality of computing compartments in response to requests from the workload management processes to receive additional resources, monitoring operations of the master workload management process by the other workload management processes, detecting, by the other workload management processes, when the master workload management process becomes inoperable, and selecting a replacement master workload management process by the other workload management processes in response to the detecting.

17 Claims, 2 Drawing Sheets

U.S. PATENT DOCUMENTS

| | | | |
|---|---|---|---|
| 7,665,117 B2* | 2/2010 | Sequeira | 725/116 |
| 2003/0005068 A1* | 1/2003 | Nickel et al. | 709/208 |
| 2003/0177311 A1* | 9/2003 | Kurokawa et al. | 711/114 |
| 2004/0117536 A1* | 6/2004 | Franke et al. | 710/302 |
| 2004/0158333 A1* | 8/2004 | Ha et al. | 700/3 |

FOREIGN PATENT DOCUMENTS

| | | |
|---|---|---|
| JP | 3232393 | 9/2001 |
| JP | 2002202959 | 7/2002 |
| WO | WO 00/08823 | 2/1999 |

* cited by examiner

SYSTEM AND METHOD FOR REPLACING AN INOPERABLE MASTER WORKLOAD MANAGEMENT PROCESS

RELATED APPLICATIONS

The present application is related to commonly assigned U.S. Pat. No. 7,140,020, issued on Nov. 21, 2006, having U.S. patent application Ser. No. 10/206,594 entitled "DYNAMIC MANAGEMENT OF VIRTUAL PARTITION COMPUTER WORKLOADS THROUGH SERVICE LEVEL OPTIMIZATION," filed Jul. 26, 2002, which is incorporated herein by reference.

TECHNICAL FIELD

The present application is generally related to replacing an inoperable master workload management process.

BACKGROUND

Many enterprises have experienced a dramatic increase in the number of computers and applications employed within their organizations. When a business group in an enterprise deploys a new application, one or more dedicated server platforms are typically added to host the new application. This type of environment is sometimes referred to as "one-app-per-box." As more business processes have become digitized, a "one-app-per-box" environment leads to an inordinate number of server platforms. As a result, administration costs of the server platforms increase significantly. Moreover, the percentage of time that the server platform resources are actually used (the utilization rate) can be quite low.

To address these issues, many enterprises have consolidated multiple applications onto common server platforms to reduce the number of platforms and increase the system utilization rates. When such consolidation occurs, coordination of the resources of the platform between the multiple applications is appropriate. For example, it is desirable to provide a scheduling mechanism that controls access to processor resources by the various threads of the supported applications. Some scheduling mechanisms (e.g., "workload management" functionality) provide a set of shares, rules, priorities, service level objectives, and/or the like to control the scheduling of processes.

One example of workload management involves creating multiple virtual partitions in a shared resource domain. Various resources (such as processors, memory, input/output (IO) resources, and/or the like) are typically assigned to each virtual partition. Also, a respective operating system can be executed within each virtual partition. Respective groups of related applications may be executed within each virtual partition. The configuration of the virtual partitions provides a degree of isolation between the groups of applications of the various virtual partitions. Additionally, a workload management process may be executed within each virtual partition to control access to resources within the virtual partitions. Specifically, within a particular virtual partition, the workload management process may schedule access to processor resources between the applications of the group assigned to the virtual partition.

In addition to workload management within virtual partitions, another level of resource management occurs by reallocating resources between the virtual partitions. Specifically, if the workload management process within a virtual partition determines that service level objectives cannot be obtained for the group of applications, the workload management process may request additional resources from a "global" workload management process. Upon the basis of rules, shares, priorities, service level objectives, and/or the like, the global workload management process may shift resources from another virtual partition to the requesting partition. For example, if the other partition has excess resources, those resources can be reassigned to the requesting virtual partition. The use of workload management functionality enables the utilization rates associated with computing resources to be improved. Accordingly, workload management functionality enables a more efficient use of computing resources.

SUMMARY

In one embodiment, a method comprises executing respective workload management processes within a plurality of computing compartments to allocate at least processor resources to applications executed within the plurality of computing compartments, selecting a master workload management process to reallocate processor resources between the plurality of computing compartments in response to requests from the workload management processes to receive additional resources, monitoring operations of the master workload management process by the other workload management processes, detecting, by the other workload management processes, when the master workload management process becomes inoperable, and selecting a replacement master workload management process by the other workload management processes in response to the detecting.

DETAILED DESCRIPTION

Although known workload management functionality provides a number of benefits when compared to prior computing environments, known workload management functionality is subject to some limitations. In particular, if a system failure occurs that effects the global workload management process, sharing of resources between virtual partitions will cease. Accordingly, the utilization rate of resources may be lower than possible until a system reset occurs according to administrator intervention.

In some representative embodiments, computing partitions or nodes (isolated domains of computing resources and related software) are arranged into a cluster organization. A respective workload management process is selected as a "master" process to reallocate resources between the various member nodes in response to the workload management processes of the other nodes. During operation of the cluster, a "heartbeat" is used to communicate that the master workload management process is functioning properly. For example, an explicit signal may be communicated from the master workload management process to each of the other workload management processes. As long as the other workload management processes receive the signal, operations continue as normal. However, upon failure to receive the signal, each non-master workload management processes will enter a non-member state since due to the inability to communicate with the master process. In one embodiment, when all of the other processes reach that state, the processes elect a replacement master process to take over reallocation of resources between the computing partitions. The non-elected processes then enter a member state where the non-elected processes respond to the newly elected master workload management process.

Figure 1:
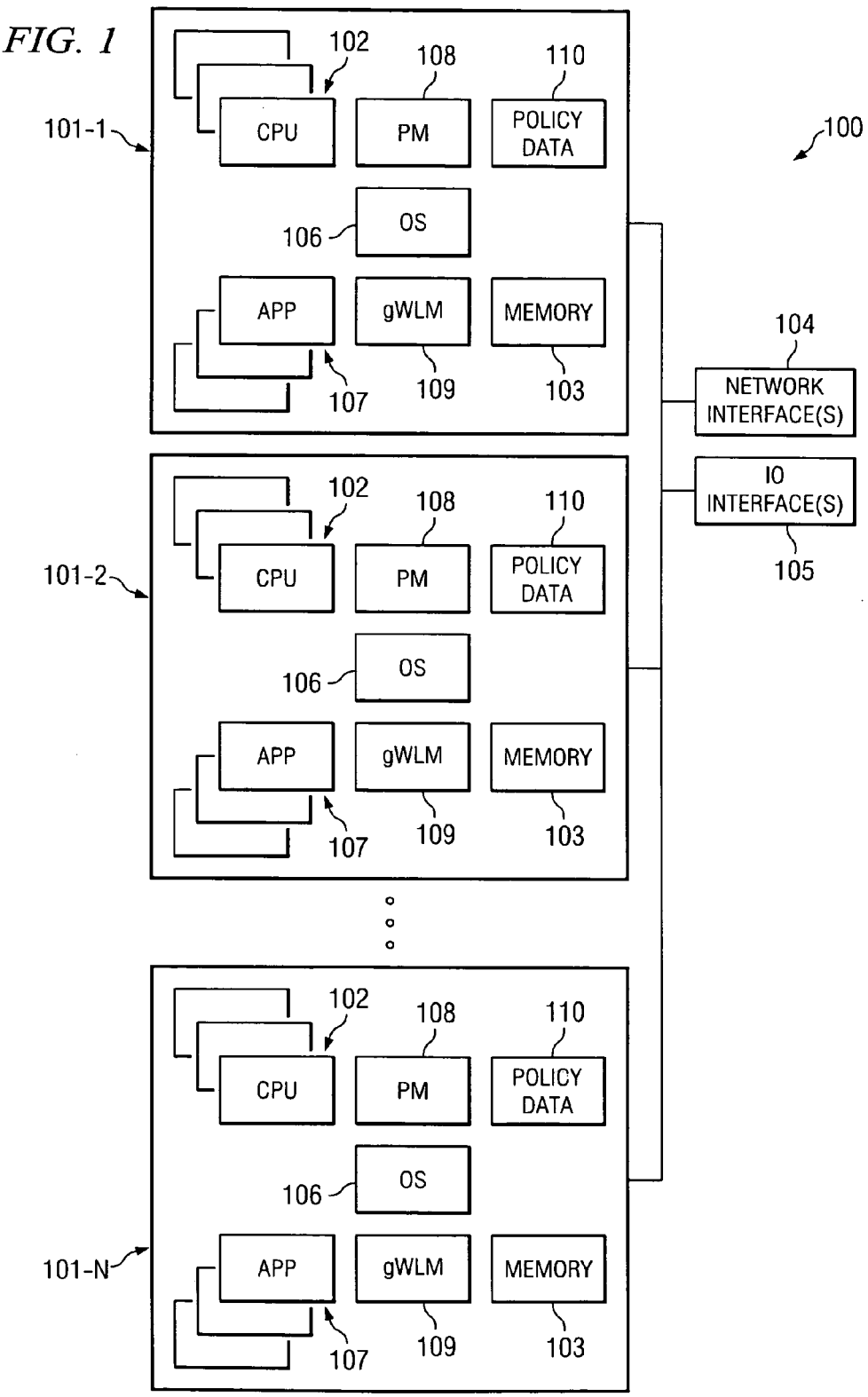
FIG. 1 depicts a computing system according to one representative embodiment.

Referring now to the drawings, FIG. 1 depicts computing system 100 that includes workload management functionality according to one representative embodiment. System 100 includes a plurality of virtual partitions 101-1 through 101-N or other suitable computing compartments. Virtual partitions 101 are protective domains of resources of a server platform. Selected processors 102 and specific portions of memory 103 of the server platform may be allocated between partitions 101-1 through 101-N. Partitions 101 may share resources such as network interface 104 and input/output (IO) interface 105. Suitable queuing and scheduling mechanisms (not shown) may be used to allocate access to network interface 104 and 10 interface 105 as an example. Although one representative embodiment is described as using virtual partitions, any suitable computing environment may be used to implement embodiments. Specifically, any computer system having at least one resource subject to allocation may employ an embodiment to determine which software processes are to receive access to the resource.

A respective operating system 106 may be executed to control the processing within each partition 101. Respective applications 107 or sets of applications are executed within partitions 101-1 through 101-N. Applications 107 may correspond to the business processes of various business units of a corporate entity, for example. The use of partitions enables a number of advantages. For example, if a software error or fault occurs within any partition 101, only that partition 101 will be affected and the other partitions 101 will continue processing without interruption.

In one embodiment, within partitions 101-1 through 101-N, performance monitors 108 are software processes that monitor operations associated with applications 107. For example, performance monitors 108 may examine the length of time required to perform selected types of transactions. Additionally or alternatively, performance monitors 108 may monitor the utilization rates associated with the processors, IO peripherals, network interfaces, or other resources by the applications 107 associated with partitions 101-1 through 101-N. The performance metrics gathered by performance monitors 108 are communicated to global workload managers (gWLMs) 109.

In one embodiment, gWLMs 109 are software processes that use the performance metrics to dynamically allocate resources within partitions 101-1 through 101-N according to policy data 110. The policy data may identify service level objectives (SLOs) (i.e., desired operating goals). For example, an SLO may be defined to specify the desired length of time to complete a specific type of database transaction to equal one millisecond. Alternatively, an SLO may be defined to specify that the utilization rate of a resource should be maintained below 85%. If one of gWLMs 109 is unable to cause the respective SLO(s) to be obtained through allocation within a given partition 101, the gWLM 109 may communicate a request to obtain additional resources.

Some representative embodiments select a single one of gWLMs 109 to further act as a master workload process. The master workload management process receives requests from the other gWLMs 109 to control on a dynamic basis the allocation of resources between partitions 101. Reallocation of resources between partitions may also occur as defined by policy data 101. For example, a processor or set of processors could be removed from one partition 101 and assigned to another partition 101 to address the failure to achieve an SLO.

In one embodiment, the SLOs may also be encoded using several tiers of objectives with each tier having a relative priority. The master gWLM 109 may allocate system resources to achieve the highest possible SLO tier given the current performance data. The reallocation of resources may involve reallocation of idle resources and/or reallocation of used resources from applications of lower priority. Any suitable resource could be assigned in this manner such as memory, storage resources, networking resources, operating system resources, and/or the like.

In addition to selecting a workload process within one of the partitions 101, some representative embodiments enable reallocation of resources to continue after failure of the workload process or any other relevant processes within the pertinent partition 101. Specifically, some representative embodiments monitor operations of the master workload management process. When each of the non-master management workload processes detect that the master workload management process has become inoperable, the non-master workload management processes autonomously reorganize by selecting a replacement master workload management process.

Figure 2:
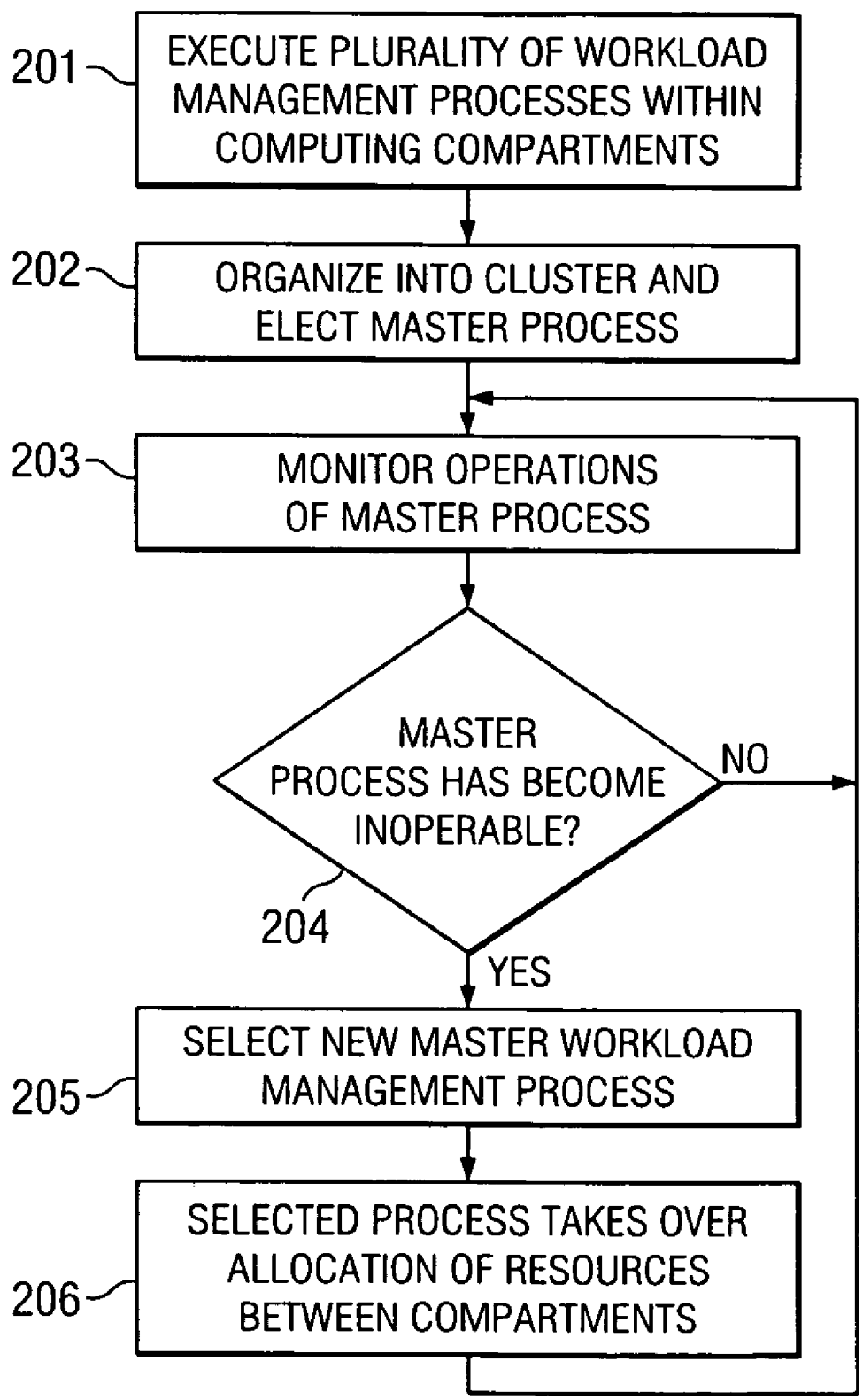
FIG. 2 depicts a flowchart according to one representative embodiment.

FIG. 2 depicts a flowchart for operations associated with workload management processes according to one representative embodiment. The flowchart may be implemented using computer executable code or software stored in a computer-readable storage medium. In step 201, a plurality of workload management processes are executed within a plurality of computing compartments (e.g., virtual partitions). The workload management processes dynamically adjust the allocation of resources between applications within the compartments according to allocation policies. The resources may include processors, memory, networking resources, IO resources, and/or the like.

In step 202, the workload management processes organize into a cluster and one of the plurality of workload management processes is selected as a master process. The initial master process may be selected by default, randomly, or by any suitable method. A cluster identifier may also be generated at this point. The master process dynamically manages the allocation of resources between the various partitions. For example, the non-master workload management processes may communicate requests for additional resources to the master workload management process, communicate performance data, and/or other suitable information to the master workload management process. In response, the master workload management process may shift resources between partitions. The decision to shift resources may occur according to predetermined policy data, current workload data (e.g., utilization rate data), and/or the like.

In step 203, the operations of the master workload management process are monitored by the other workload management processes. An explicit signal may be communicated from the master workload management process to the other workload management process for this purpose. Alternatively, method calls used for other purposes may be monitored for this purpose. For example, in one embodiment, the master workload process may call methods associated with the other workload management processes to obtain data relevant to reallocation decisions. If the respective method or methods are not called, it may be inferred that the master workload management process has become inoperable. In another embodiment, the other workload management processes may periodically call a method associated with the master workload management process. If an exception occurs or a response is not received, it may also be inferred that the workload management process has become inoperable.

In step 204, a logical comparison is made to determine whether the master workload management process has become inoperable. For example, a timer may be maintained that is related to the detection of the pertinent operation of the master workload management process. The timer may be used to differentiate between a common network or other system difficulty and failure of the master workload management process. If the logical comparison determines that the master workload management process is operable, the process flow returns to step 203. If the logical comparison determines that the master workload management process is inoperable, the process flow proceeds to step 205.

In step 205, the workload management processes select a new master workload management process. The selection may occur after a predetermined number or all of workload management processes have detected failure of the master process. The selection process may involve an "election" between the remaining processes. For example, each workload management process may communicate a "voting call" message between each other to ensure that the processes have transitioned to the appropriate state and are ready to select the replacement process. After it is determined that the management processes are in the appropriate state, the processes may communicate their selection of the replacement process. The selections may occur according to any suitable pre-defined scheme (e.g., the workload management process having the lowest identifier may be selected). Upon agreement between the processes, the process flow may proceed to step 206.

In step 206, the elected workload management process takes over the reallocation of resources between the computing compartments. Also, a new cluster identifier may be generated at this step. The cluster identifier may be used to prevent the previous workload management process from attempting to make reallocation operations. Specifically, the previous workload management process might have become inoperable due to a temporary system difficulty. Upon recovery, the previous workload management process may attempt to reallocate resources. If method calls are used to reallocate resources between partitions and the cluster identifier may be passed as an argument for the methods. The called methods may verify the cluster identifier to prevent the prior master workload management process from interfering with current operations.

From step 206, the process returns to step 203 where further workload management operations continue. In another embodiment, when the operations associated with the partition of the previous master workload management process are re-established, the prior management process may rejoin the new cluster as a member management process.

Some representative embodiments may provide a number of advantages. In particular, resources may be efficiently transferred between computing compartments in response to application demands. Moreover, some representative embodiments are robust against a software failure, partial network interruption, or other system difficulty. Specifically, each workload management process is capable of performing allocation of resources between compartments and, hence, selection of a replacement master process enables resources to be transferred without requiring a system reset to occur.

What is claimed is:

1. A method, comprising:
    executing respective workload management processes within a plurality of computing compartments to allocate at least processor resources to applications executed within said plurality of computing compartments;
    selecting a master workload management process to reallocate processor resources between said plurality of computing compartments in response to requests from said workload management processes to receive additional resources;
    monitoring operations of said master workload management process by the other workload management processes, wherein said monitoring comprises determining whether said master workload management process performs a method call to said other workload management processes and wherein said method call is a method call to obtain information associated with reallocation decisions to be made by said master workload management process;
    detecting, by the other workload management processes, when said master workload management process becomes inoperable; and
    selecting a replacement master workload management process by the other workload management processes in response to said detecting, wherein the selecting of said replacement master workload management process includes each of the other workload management processes communicating a vote to each other.

2. The method of claim 1 wherein said monitoring comprises:
    determining whether said master workload management process fails to respond to said method call.

3. The method of claim 1 further comprising:
    operating a timer associated with a last detected operation of said master workload management process.

4. The method of claim 1 wherein each of said other workload management processes transitions to a non-member state in response to said detecting.

5. The method of claim 4 wherein each of said other workload management processes communicate with each other to determine whether each of said other workload management processes have reached said non-member state before performing said selecting a replacement.

6. The method of claim 1 further comprising:
    reestablishing operation of a previous master workload management process;
    generating an exception when said previous master workload management process attempts to perform an operation associated with reallocation of processing resources after said selecting a replacement has been performed; and
    joining, by said previous master workload management process, said other workload management processes as a member process.

7. The method of claim 1 wherein said computing compartments are virtual partitions.

8. The method of claim 1 further comprising:
    generating an identifier to identify a current master workload management process.

9. The method of claim 8 wherein said current master workload management process passes said identifier to methods that perform allocation of resources between said plurality of computing compartments.

10. A computer-readable storage medium having computer-readable program code stored thereon for causing a computer system to execute computer executable code, said computer executable code comprising:
    code for creating respective workload management processes for each of a plurality of computing compartments, wherein said workload management processes send requests to obtain additional resources to a master workload management process of said workload management processes;

code for monitoring operations of said master workload management process;

code for detecting when said master workload management processes becomes inoperable;

code for selecting a replacement master workload management process by the other workload management processes in response to said detecting, wherein the selecting of said replacement master workload management process includes each of the other workload management processes communicating a vote to each other; and code for generating an exception when a previous master workload process attempts to perform an operation associated with reallocation of processing resources after a replacement has been selected.

11. The computer-readable storage medium of claim 10 wherein said code for monitoring is operable to determine whether said master workload management process has performed a method call to said other workload management processes.

12. The computer-readable storage medium of claim 11 wherein said method call is a method call to obtain information associated with reallocation decisions to be made by said master workload management process.

13. The computer-readable storage medium of claim 10 further comprising:

code for maintaining a timer associated with a last detected operation of said master workload management process.

14. The computer-readable storage medium of claim 10 further comprising:

code for communicating between each of said plurality of other workload management processes to determine whether each of said other workload management processes have detected that said master workload management process has become inoperable.

15. The computer-readable storage medium of claim 14 wherein said code for selecting a replacement is operable only after each of said other workload management processes have detected that said master workload management process has become inoperable.

16. The computer-readable storage medium of claim 10 wherein said previous master workload management process calls a method to re-associate with said other workload management processes after receiving said exception.

17. The computer-readable storage medium of claim 10 further comprising:

code for generating an identifier to identify a current master workload management process.

* * * * *

UNITED STATES PATENT AND TRADEMARK OFFICE
CERTIFICATE OF CORRECTION

| | | |
|---|---|---|
| PATENT NO. | : 7,979,862 B2 | |
| APPLICATION NO. | : 11/019070 | |
| DATED | : July 12, 2011 | |
| INVENTOR(S) | : Troy Don Miller et al. | |

It is certified that error appears in the above-identified patent and that said Letters Patent is hereby corrected as shown below:

In column 7, line 12, in Claim 10, delete "workload process" and insert -- workload management process --, therefor.

Signed and Sealed this
Twentieth Day of December, 2011

David J. Kappos
*Director of the United States Patent and Trademark Office*